Feb. 5, 1952  R. C. MOFFITT ET AL  2,584,149
VEHICLE OPERATION RECORDER
Original Filed Feb. 13, 1946  5 Sheets-Sheet 1
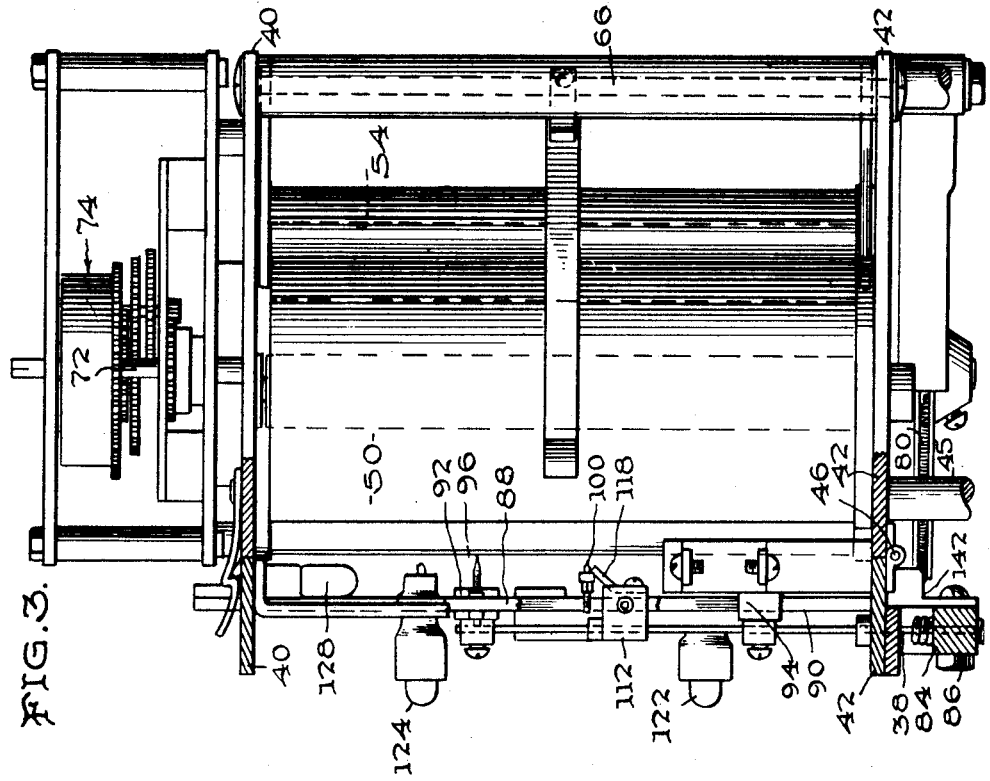
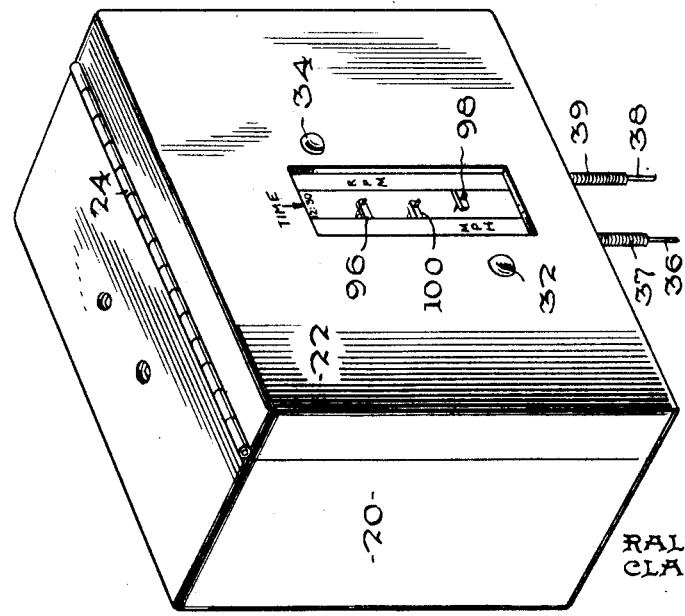
Inventors
RALPH C. MOFFITT
CLARENCE C. CHELF
By *Leech & Radue*
Attorneys

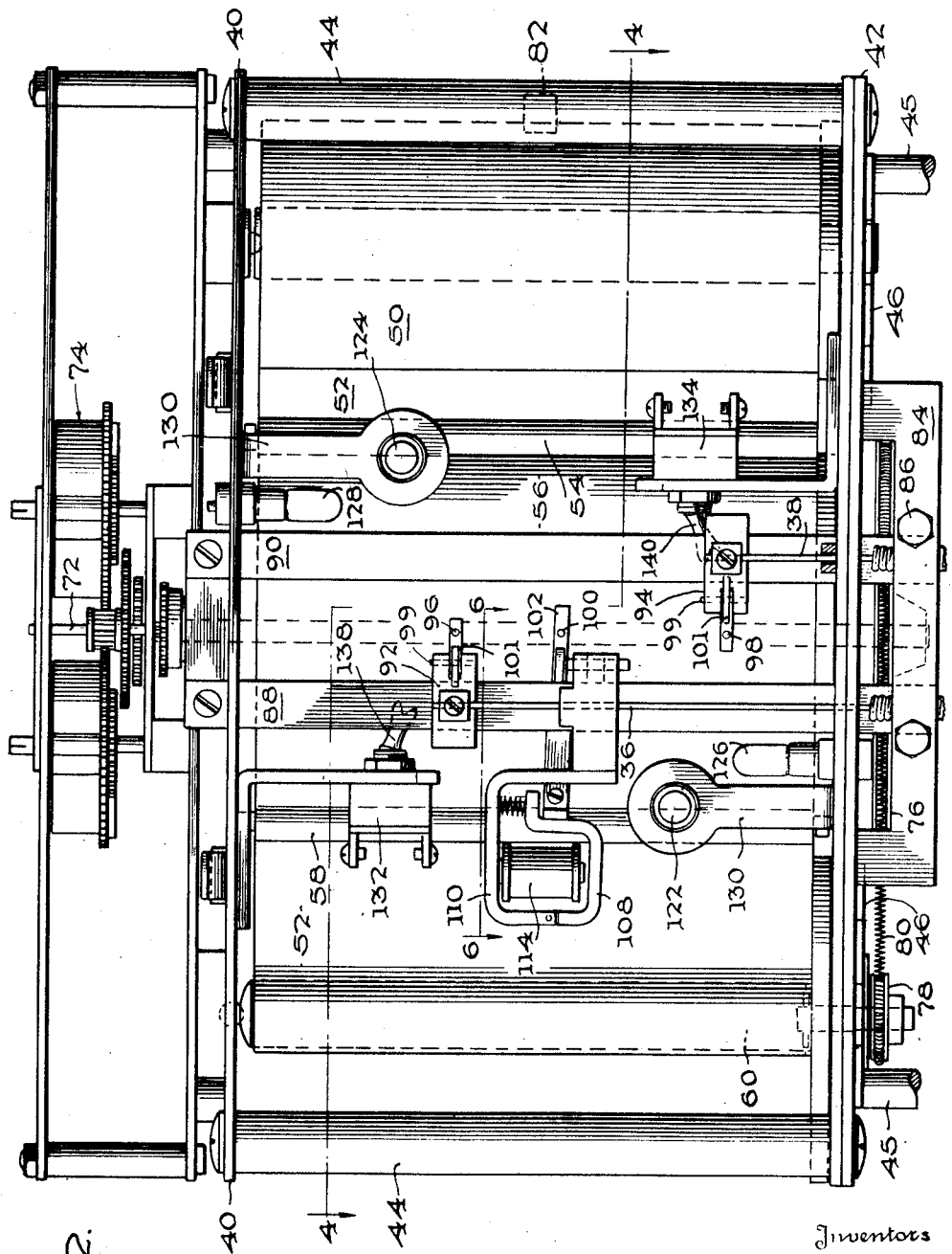

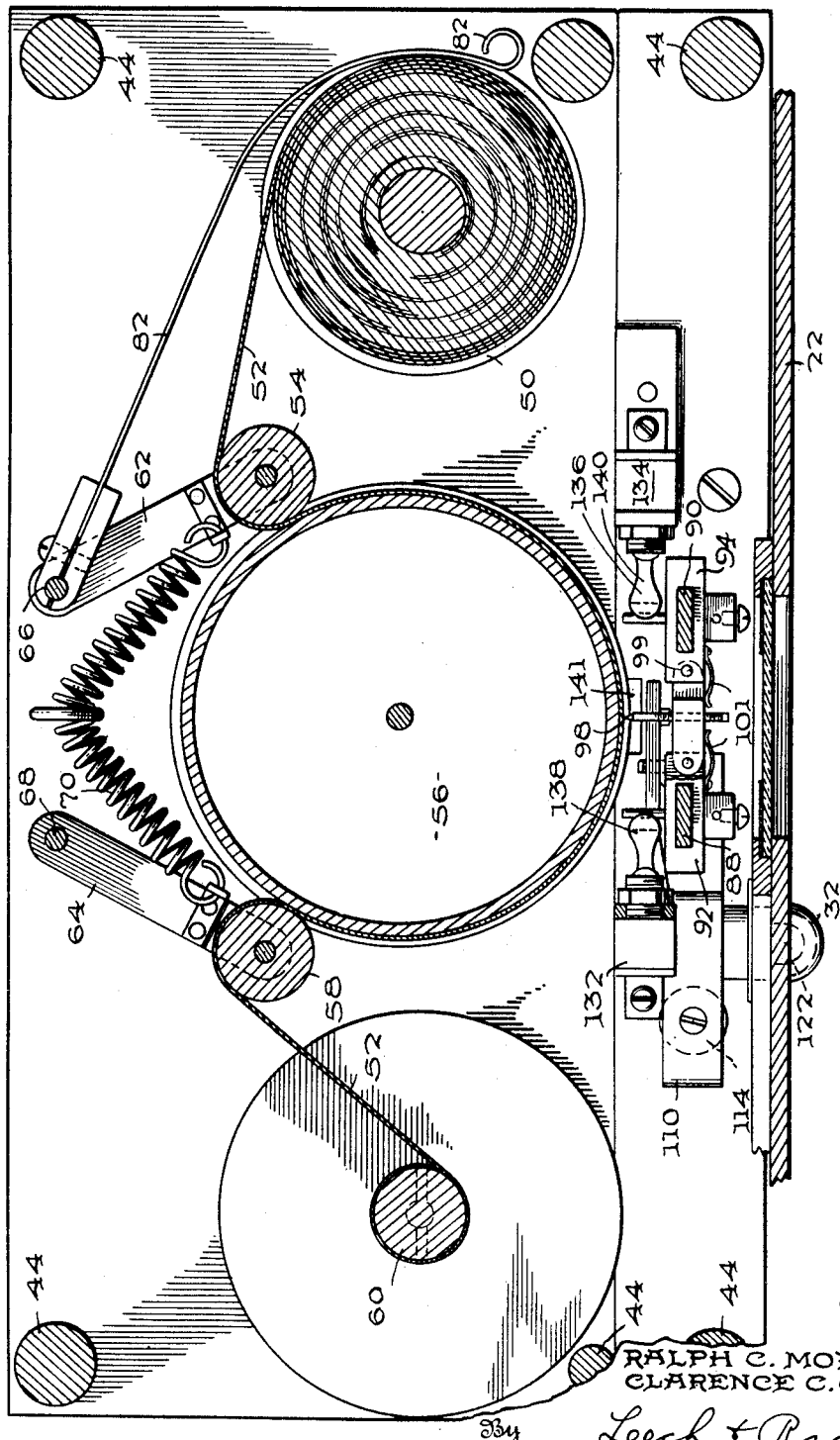

Feb. 5, 1952 — R. C. MOFFITT ET AL — 2,584,149
VEHICLE OPERATION RECORDER
Original Filed Feb. 13, 1946 — 5 Sheets-Sheet 4
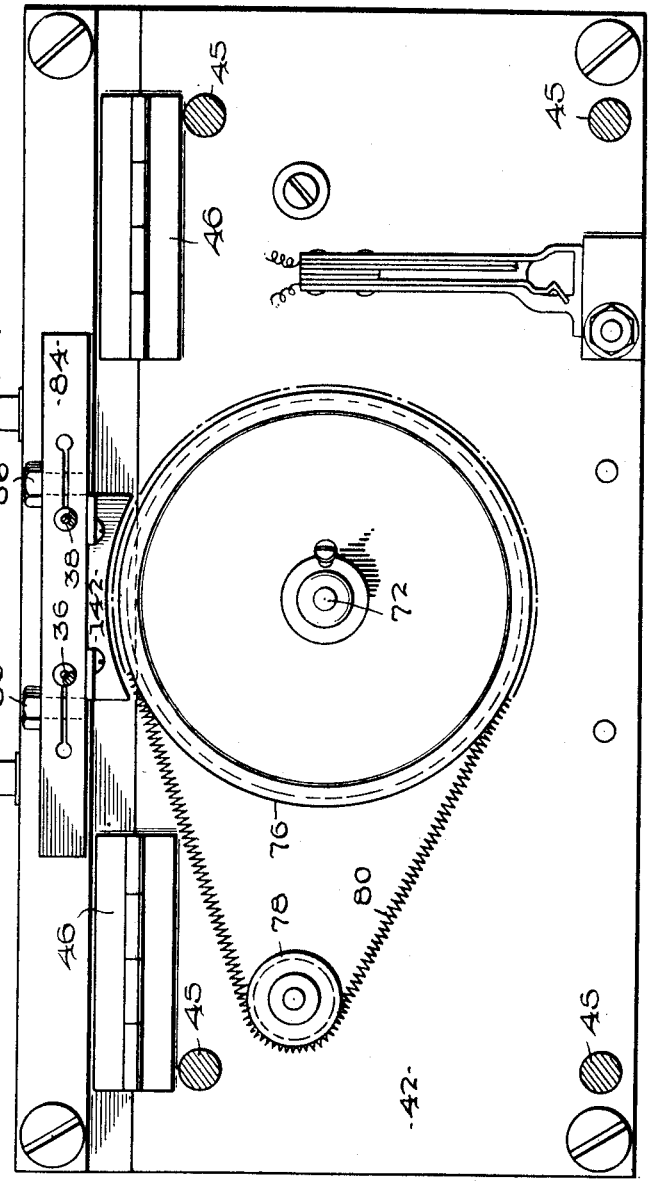
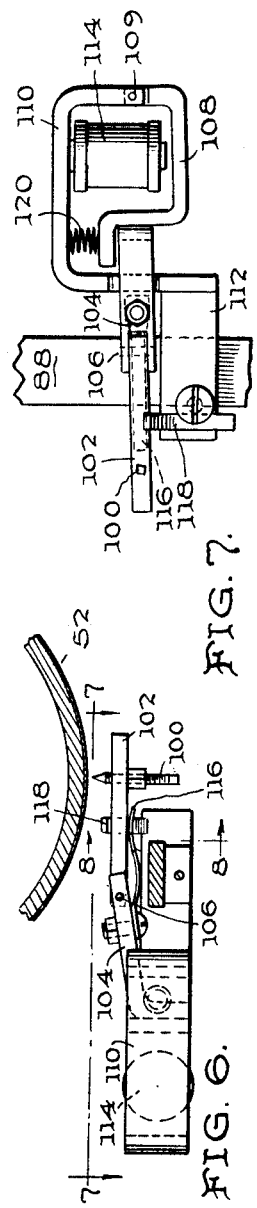
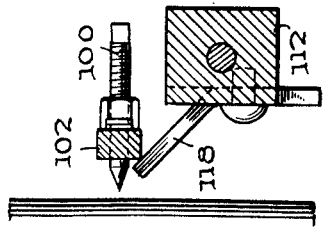
Inventors
RALPH C. MOFFITT
CLARENCE C. CHELF
By Leech & Radue
Attorneys Feb. 5, 1952     R. C. MOFFITT ET AL     2,584,149
VEHICLE OPERATION RECORDER
Original Filed Feb. 13, 1946     5 Sheets-Sheet 5
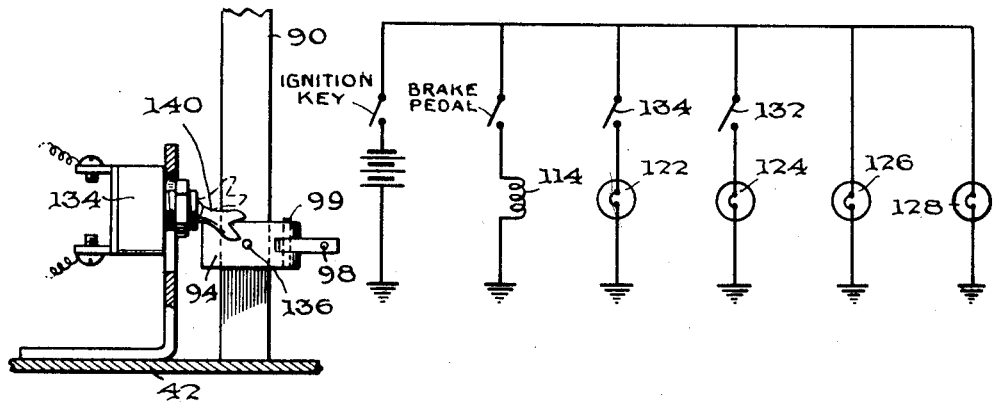
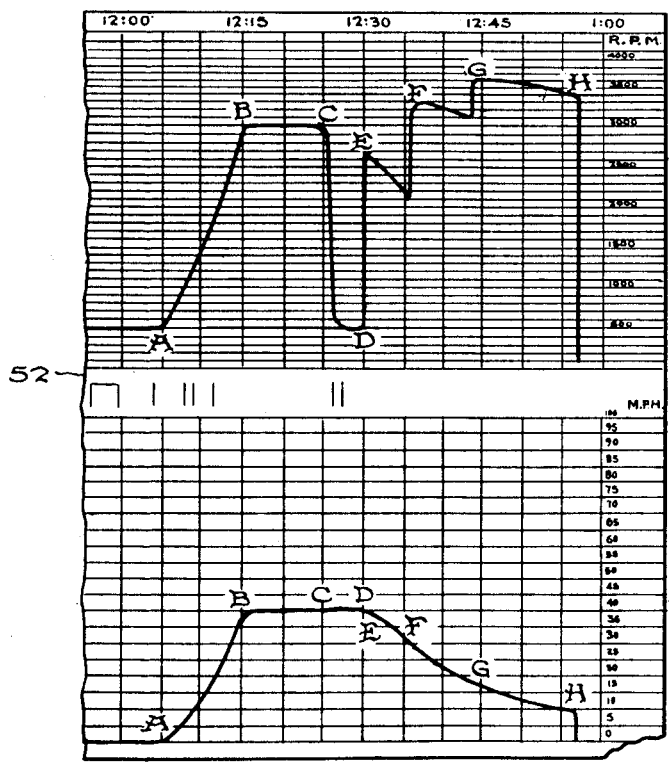
Inventors
RALPH C. MOFFITT
CLARENCE C. CHELF
By Leech & Radue
Attorneys Patented Feb. 5, 1952

2,584,149

UNITED STATES PATENT OFFICE 2,584,149

VEHICLE OPERATION RECORDER

Ralph C. Moffitt, Louisville, and Clarence C. Chelf, Lebanon, Ky., assignors of one-third to said Moffitt and two-thirds to said Chelf Continuation of application Serial No. 647,251, February 13, 1946. This application April 20, 1950, Serial No. 157,128

8 Claims. (Cl. 346—49)

The present invention relates generally to apparatus for graphically recording the operations of motor vehicles, and more particularly to an apparatus which will record such details of normal vehicle operation as motor racing, coasting of the vehicle, the particular gear ratios, braking, etc., and the time and duration of each such occurrence.

This application is a continuation of application Serial No. 647,251, filed February 13, 1946, and now abandoned.

As is well known, the proper maintenance and repair of motor vehicles is a highly costly item to fleet owners whether the vehicles are taxis, trucks or buses. Efforts are made to keep the cost of such maintenance at a minimum by requiring compliance by the drivers with rigid rules of vehicle operation so as to reduce the frequency of overhaul and repair jobs.

Heretofore the most successful method of checking on the driver's compliance with such company rules concerning safe and efficient vehicle operation resided in an actual observation of the operation of the vehicle. Obviously the cost of observing the operation of all vehicles at all times or even intermittently is prohibitive and unfeasible to the fleet owners.

Other means of checking on vehicle operation which are intended to solve the fleet owner's problem at least in part are now available to him. These include recorders of speed, distance traveled, etc., but none of these devices provide the essential information which informs the owner as to which driver abuses the engine of his vehicle or violates the company's safety regulations.

Accordingly the chief object of the present invention is to provide a graphic recorder of motor vehicle operation which will accurately record in detail the driver's handling of the vehicle and its engine, and his degree of compliance with such company safety regulations as descending mountain grades in the proper gear and without prolonged use of the brakes, etc.

Another important object of the present invention is to provide a recording apparatus which graphically correlates the engine speed of a vehicle with its forward speed so as to make available precise data concerning the engine performance and its abuse or efficiency to determine if the vehicle was carelessly driven or the need for maintenance, respectively.

A further object is to provide a complete and compact recording device for attachment to motor vehicles which may be readily serviced or removed therefrom and which may not be tampered with by the driver of the vehicle.

A further object is to provide a graphic recording apparatus for motor vehicles which is simple and relatively inexpensive to manufacture, and rugged in use so as to readily withstand the hard service to which it is put without becoming inaccurate or requiring frequent servicing.

Other objects and advantages of the invention will become apparent during the course of the following description.

In the drawings we have shown one embodiment of the invention, in which:

Fig. 1 is a perspective view of the apparatus ready to be mounted in the driver's compartment of the vehicle;

Fig. 2 is a front elevational view of the apparatus with the case removed;

Fig. 3 is a side elevational view looking from the right in Fig. 2;

Fig. 4 is a horizontal sectional view taken on the line 4—4 of Fig. 2;

Fig. 5 is a bottom plan view of the apparatus;

Fig. 6 is a horizontal section view to an enlarged scale taken on the line 6—6 of Fig. 2;

Fig. 7 is a rear elevational view of the stylus actuating mechanism shown in Fig. 6;

Fig. 8 is a vertical sectional view taken on the line 8—8 of Fig. 6;

Fig. 9 is a side elevational view of the warning light switch operating slide;

Fig. 10 is a diagrammatic sketch of the electric circuit of the recording device as incorporated in the regular electric circuit of a vehicle; and Fig. 11 is a fragmentary view taken to an enlarged scale of the record paper used in the apparatus.

Referring now to the drawings, numeral 20 designates the case enclosing the apparatus and provided with a cover 22 hinged as at 24 for a purpose to be described. The cover 22 is provided with a central vertically-elongated windowed aperture which permits observation of the movement of the recording cylinder, and the M. P. H. and R. P. M. recording styluses, respectively. The time may be read from the uppermost part of the recording cylinder as indicated by the arrow.

A brake actuated recording stylus is located intermediate the vertical sliding paths of the M. P. H. and R. P. M. styluses, each of which paths extends less than half the height of the recording cylinder. A pair of red glass covered apertures 32 and 34 are also provided in the cover 22 and are illuminated whenever the M. P. H. or R. P. M. respectively of the vehicle exceeds that for which the apparatus is set, according to the particular wishes of each owner.

The case 20 is attached to the dash, etc., of a motor vehicle by suitable brackets and then connected by the flexible cables or Bowden wires 36 and 38 to flyball governors which are in turn rotatably connected to the engine and transmission of the vehicle. The electrical system is connected to the regular battery circuit and need not be locked (as is the case 20) against tampering by the driver as it warns him should he exceed the operational conditions for which the apparatus is set.

The apparatus comprises a pair of supporting plates 40 and 42 spaced by end leg members 44 and the lower plate 42 is supported within the case 20 by additional legs 45. It will be noted (Fig. 3) that the forward ends of the plates 40 and 42 and their spacing supporting legs 44 are adapted to be pivoted forwardly as a unit about the hinge 46 so as to provide ready access to the paper supporting cylinder and spools.

A roll 50 of waxed recording paper 52 ruled as shown in Fig. 11 is rotatably journalled between the plates 40 and 42 at the right of the apparatus (Fig. 4) and the web 52 is fed around an idler roller 54, around the front of a recording cylinder 56, back around an idler roller 58 and thence around a takeup roll 60. The idler rollers 54 and 58 are supported by arms 62 and 64 pivoted on vertical axes 66 and 68 and are constrained to press the paper web 52 against cylinder 56 by a connecting tension spring 70 so as to prevent sliding of the paper on the cylinder surface.

The recording cylinder 56 is mounted on a shaft 72 which is driven by a clock motor 74 mounted on the plate 40. The lower end of the shaft 72 supports a large diameter pulley 76 (Fig. 5) which drives a smaller pulley 78 on the lower end of the shaft of the take-up roller 60 by means of a spring or other flexible drive belt 80.

A tensioning and braking spring arm 82 is adjustably mounted on pivot 66 to bear against the recording paper roll 50 and prevents any slackening of the web 52 as it approaches idler roller 54.

It will be apparent that as the clock motor 74 drives the recording cylinder 56, the paper web 52 will move about its surface with a linear speed which will cause one vertical line of the ruled web to pass a given point (the arrow indicator on the cover 22) every five minutes. The takeup roller 60 being driven by the belt 80 maintains the web 52 taut on leaving the roller and the frictional resistance between the web and the cylinder 56 is thus sufficient to prevent slipping therebetween.

The Bowden cables 36 and 38 are slidably encased in cables 37 and 39, the upper ends of which project through and are clamped by a split bar 84 having tightening screws 86. A pair of spaced parallel bars or tracks 88 and 90 are fixed in vertical position to the front edge of the plates 40 and 42 and include highly machined surfaces upon which stylus-supporting slides 92 and 94 reciprocate. The Bowden wires 36 and 38 are connected respectively to slides 92 and 94 at their upper ends and to flyball governors of conventional type at their lower ends so that the slides are moved vertically directly in accordance with variations in R. P. M. and M. P. H. respectively.

A pair of styluses 96 and 98 are respectively pivotally supported in the slides 92 and 94 as at 99 and are provided with resilient means 101 urging them into contact with the record-paper covered drum 56 in vertical alignment. A third stylus 100 is positioned substantially midway of the record sheet 52 and is adjustably mounted (see Figs. 6-7-8) in an arm 102 which is pivotally connected to a second arm 104 by the vertical pivot 106. The arm 104 is fixed to a U-shaped bracket 108 which is pivotally connected by a horizontal pivot pin 109 to an inverted U-shaped bracket 110 fixed to a stop member 112 on the bar 88.

The bracket 110 supports a coil 114 which is adapted to be energized upon application of the vehicle brakes to lift the bracket 108 and arms 102 and 104 upwardly as a unit about the pin 109. A resilient member 116 mounted on the front face (Fig. 6) of arm 104 bears on arm 102 to urge it rearwardly so as to cause the point of stylus 100 to engage the record web 52. An inclined guide bar 118 is secured to the stop 112 to hold the stylus 100 away from the web between brake applications. When the coil 114 is de-energized, a compression spring 120 forces the bracket 108 and arms 102, 104 downwardly about pivot pin 109 and the guide 118 simultaneously forces the bar 102 forwardly about its vertical pivot 106 and against the action of the resilient member 116. Thus, energization of the coil 114 effects an engagement of the stylus with the web 52 to trace a vertical line in vertical alignment with the styluses 96 and 98 which upon de-energization, the stylus 100 is automatically returned to its lower web-disengaged position.

Figure 10 discloses a wiring diagram showing the manner in which the coil 114, a pair of warning lights 122 and 124, and a pair of web illuminating lights 126 and 128 are connected into the vehicle electrical system. The lights 126 and 128 may be provided with additional switches (not shown) so that they may be turned off when not required so as to avoid a needless drain on the storage battery.

The warning lights 122 and 124 are mounted on suitable brackets 130 and are positioned so as to illuminate the red glass apertures 32 and 34 of the cover 22. The lights are provided respectively with switches 134 and 132 having notched toggles 140 and 138 each of which is adapted to be engaged by a pin 136 (Figs. 4 and 9) projecting from and fixed to the rear sides of each of the slides 92 and 94. This insures actuation of the switch in accordance with the precise degree of movement of the slides.

The surface of the recording web 52 is normally waxed so that the respective styluses may trace a recording path thereon. Wax particles thus scraped from the web fall through an aperture 141 provided on the plate 42 under the styluses and into a removable receptacle 142 (Figs. 3, 4 and 5). This eliminates any possibility of the wax particles interfering with free movement of the paper rolls or stylus slides.

The operation of the recording styluses is believed to be readily apparent. When the speed of the vehicle engine and/or the vehicle increases, the Bowden wires 36 and 38 are moved upwardly by the flyball governors to which they are operatively secured, thus raising the slides 92 and 94 to cause the styluses 96 and 98 respectively to trace a record in the waxed web 52. The web 52 is constantly passing about the drum 56 under the influence of the clock motor 74, each vertical graduation corresponding to five minutes, as shown by the sample web disclosed in Fig. 11.

As stated the three styluses 96, 98 and 100 are in vertical alignment so that for any given time, the precise manner of operation of the vehicle may be determined, as will be apparent from the following description.

The time intervals are indicated at the top of the web 52 and are readily visible externally of the cover 22, as shown in Fig. 1. Assuming, as shown by the position of the record sheet in Fig. 11, that the driver starts his engine at 11:55 and warms the engine until 12:05, the upper portion of the web shows during this period an idling R. P. M. of approximately 500 and the lower portion a M. P. H. of zero.

It will be noted by the unruled central portion of the web 52 that the driver has maintained a foot brake application from 11:56 to 12:00 o'clock as shown by horizontal line connecting the top ends of the vertical brake lines and at 12:04 apparently made an instantaneous test application thereof before commencing his run. The records subsequently show from A—B a substantially steady rise in R. P. M. and M. P. H. with interspersed brake applications until 12:15 at which time the normal cruising R. P. M. of 3000 and M. P. H. of 40 is attained and held until 12:25 as at C.

It will be appreciated that the graphical record actually obtained from the apparatus includes many minor abrupt changes in R. P. M. and M. P. H. and more brake applications than shown due to city driving conditions. Accordingly the graphical record of Fig. 11 has been smoothed out to more clearly demonstrate the principles involved.

As shown from C to D, the R. P. M. of the vehicle engine dropped to idling speed of 500 while the M. P. H. is maintained at 40 which is slightly exceeded. The M. P. H. having been set for 40 M. P. H., the pin 136 of slide 94 had actuated the toggle 140 of the switch 134 to illuminate the warning light 122 which is visible to the driver through the aperture 32 of the cover 22 of the apparatus case 20. Accordingly the driver made speed reducing brake applications as at 12:27 and 12:28.

A more important disclosure of the record from C to D however is that the drop in R. P. M. and maintenance of the M. P. H. shows conclusively that the driver was coasting his vehicle out of gear—a practice strictly against the regulations of all transport companies. A short period of coasting in gear (as required) is indicated by the flat portion of the R. P. M. curve at C.

As indicated by the portion of the graph DE which shows the R. P. M. suddenly increased and the M. P. H. commencing to decrease, the driver here engaged the vehicle in high gear as he started up the other side of the hill. As shown from E to F the R. P. M. and M. P. H. steadily decreased resulting in a shift to a lower gear at F with an increased initial R. P. M. From F to G both R. P. M. and M. P. H. again decrease slightly and appear to level off at a low gear hill climbing rate of 3500 R. P. M. and 10 M. P. H.

A sudden stop of the vehicle and its engine is indicated at H by the R. P. M. and M. P. H. falling simultaneously and directly to zero. In the absence of a brake application marks on the web at the time of this stop—12:57—it is obvious that the driver collided with something while inattentive or asleep at the wheel regardless of any other alibis or explanations by the driver.

Thus a true and accurate record of the vehicle's operation can be obtained which will furnish information of vital importance to the owner, such as the efficiency of the driver, the cause of accidents, the need for repair, etc. It will be readily apparent that for normal driving of a specified vehicle under any conditions, a definite ratio of R. P. M. and M. P. H. exists. For example, normal R. P. M. at normal M. P. H. indicates normal and safe operation; low R. P. M. to high M. P. H. indicates unsafe coasting; high R. P. M. to low M. P. H. indicates safe gear operation up or down grades; whereas high R. P. M. and zero M. P. H. indicates motor racing while the vehicle is standing. These ratios and their variations are readily apparent from an inspection of the graph 52 as well as qualifying information supplied by the included record of the brake applications.

Thus for any given time (which may be accurately read to portions of a minute), the precise nature of the operation of a vehicle and its engine may be determined by the graphical recording means comprising the present invention which is not subject to tampering by unauthorized persons. The apparatus will not be resented by the average driver as a "detective" inasmuch as warning signals as to R. P. M. and M. P. H. are provided for his guidance and he is thus given a fair "break." A single master graph can be obtained under supervision of each driver's run and the records of subsequent runs compared therewith at the convenience of the fleet owner.

The apparatus is designed to carry large paper rolls ample for several weeks' or even months' operation and the recorded portions thereof may be readily removed from takeup roller 60 by authorized persons having a key to the locked case 20. This operation is expedited by hinging the slides, styluses, etc. in front of the paper rolls at 46. When the cover 22 is raised, the front of the apparatus may be swung outwardly for the easy removal of the graph records or the insertion of new rolls of the web 52. Slots are provided (not shown) to enable the Bowden cables to be so pivoted without their disconnection from the flyball governors.

In addition to the above and many other advantages of the present invention, it will be appreciated that the graph record obtained indicates the time and duration of starting, running and stopping of the engine, its warming up periods, and all brake applications and their occurrence whether in or out of gear and thus normal or dangerous. The interdependence of the records made simultaneously as to time by the three styluses in so far as the interpretation of the graphical record is concerned is of the utmost importance and is the main feature of the present invention.

It is to be understood that the form of our invention herewith shown and described is to be taken as a preferred example of the same and that various changes in the shape, size and arrangement of parts may be resorted to without departure from the spirit of the invention or the scope of the subjoined claims.

Having thus described my invention, what I claim as novel and desire to secure by Letters Patent of the United States is:

1. In a recorder, the combination comprising means constructed and arranged to support and drive a strip record chart at uniform speed, said supporting and driving means including a member providing an extended recording surface for said chart, and an end plate member extending transversely and inwardly of said recording surface and having its outer edge adjacent said recording surface; a supporting member hingedly connected to said outer edge of said end plate member; a bar secured perpendicularly to said supporting member and arranged to extend in parallel spaced relation transversely across a chart strip on the recording surface; a stylus slidably mounted on said bar for reciprocating movement; and a flexible operating member extending through the supporting member and operatively connected with the stylus, whereby the stylus may be swung away from the chart strip to provide access thereto without disconnecting the operating member from the stylus.

2. In a recorder, the combination comprising means constructed and arranged to support and drive a strip record chart at uniform speed, said supporting and driving means including a member providing an extended recording surface for said chart, and an end plate member extending transversely and inwardly of said recording surface and having its outer edge adjacent said recording surface; a supporting member connected to said outer edge of said end plate member for swinging movement about said edge; a bar secured perpendicularly to said supporting member and arranged to extend in parallel spaced relation transversely across a chart strip on the recording surface; a stylus slidably mounted on said bar for reciprocating movement; and an operating member extending through the supporting member and operatively connected with the stylus, whereby the stylus and the chart strip may be moved relatively to provide access without disconnecting the operating member from the stylus.

3. A vehicle operation recorder for motor vehicles comprising a casing including a pair of spaced plates mounted therein, a parallel pair of spaced rollers having their opposite ends journalled in said plates supporting and feeding a paper web therebetween, a drum rotatably mounted between said plates parallel to said rollers for partial circumferential engagement with said web, a spaced pair of guide bars mounted between adjacent edge portions of said plates on the side of the drum engaged by the web and extending parallel to the axis of said drum, a recording stylus slidably mounted on each guide bar and arranged in alignment for engagement with a web on the drum, and means for driving said drum to feed said web past said styluses at a uniform rate, means for reciprocating each of said styluses on its respective guide bars in response to variations in the engine and forward speeds of a vehicle respectively to produce a correlated record of the vehicle engine's performance simultaneously on transversely spaced portions of the web, the said edge portions being separable from the remainder of each plate and mounted for pivotal movement outwardly therefrom to provide access to said paper web for insertion and removal thereof without interference by said styluses.

4. In a device for testing the operation of a motor vehicle, the combination comprising a casing with a face opening, means within said casing constructed and arranged to support and feed a strip record chart at uniform speed across the face opening, a pair of spaced parallel tracks secured within said casing in a position to extend in spaced parallel relation transversely of the portion of the strip record chart being fed across the face opening, first and second recording styluses within the casing mounted for reciprocation on the respective tracks, an operating member adapted to respond to variations in the engine speed of the vehicle extending into the casing and operatively connected with said first recording stylus, an operating member adapted to respond to the speed of the vehicle extending into the casing and operatively connected with said second stylus, said first and second recording styluses being arranged for continuous engagement with transversely spaced parts of the portion of the strip record chart being fed across the face opening, an intermittently operable third recording stylus, means pivotally mounting said third stylus within the casing for sequential movement into engagement with the strip record chart being fed across the face opening and a predetermined distance transversely thereof and in alignment with said first and second recording styluses, and electromagnetic means within the casing operating on said mounting means for moving the third stylus said predetermined distance upon each actuation, said electromagnetic means being connected with and responsive to operation of the brake of the vehicle.

5. In a vehicle operation recorder for motor vehicles, the combination comprising a casing including a pair of spaced plates mounted therein, a parallel pair of spaced rollers having their opposite ends journalled in said plates supporting and feeding a paper web therebetween, a drum rotatably mounted between said plates parallel to said rollers for partial circumferential engagement with said web, a guide bar mounted between adjacent edge portions of said plates on the side of the drum engaged by the web and extending parallel to the axis of said drum, a recording stylus slidably mounted on said guide bar and arranged for engagement with a web on the drum, means for driving said drum to feed said web past said stylus at a uniform rate, means for reciprocating said stylus on said guide bar in response to variations in a speed function of a vehicle to produce a time correlated record of vehicle performance on a portion of the web, the said edge portions being separable from the remainder of each plate and mounted for relative swinging movement with respect to said remainders to provide access to said paper web for insertion and removal thereof without interference by said stylus.

6. In a device for testing the operation of a motor vehicle, the combination comprising a casing with a face opening, means within said casing constructed and arranged to support and feed a strip record chart at uniform speed across the face opening, a pair of spaced parallel tracks secured within said casing in a position to extend in spaced parallel relation transversely of the portion of the strip record chart being fed across the face opening, first and second recording styluses within the casing mounted for reciprocation on the respective tracks, an operating member adapted to respond to variations in the engine speed of the vehicle extending into the casing and operatively connected with said first recording stylus, and operating member adapted to respond to the speed of the vehicle extending into the casing and operatively connected with said second stylus, said first and second recording styluses being arranged for continuous engagement with transversely spaced parts of the portion of the strip record chart being fed across the face opening, an intermittently operable third recording stylus, means pivotally mounting said third stylus within the casing for sequential movement into engagement with another part of the strip record chart being fed across the face opening and a predetermined distance transversely thereof in spaced alignment with said first and second recording styluses, and electromagnetic responsive means operating on said mounting means for moving the third stylus said predetermined distance upon each actuation, said electromagnetic means being connected with and responsive to operation of the brake of the vehicle.

7. In a device for testing the operation of a motor vehicle, the combination comprising a casing, means within said casing constructed and arranged to support and feed a strip record chart at uniform speed, a pair of spaced parallel tracks secured within said casing in a position to extend in spaced parallel relation transversely of an exposed portion of the strip record chart being fed, first and second recording styluses within the casing mounted for reciprocation on the respective tracks, an operating member adapted to respond to variations in the engine speed of the vehicle extending into the casing and operatively connected with said first recording stylus, an operating member adapted to respond to the speed of the vehicle extending into the casing and operatively connected with said second stylus, said first and second recording styluses being arranged for continuous engagement with transversely spaced parts of the exposed portion of the strip record chart being fed, an intermittently operable third recording stylus normally disengaged from the strip record chart, means pivotally mounting said stylus within the casing for sequential movement into engagement with another part of the strip record chart being fed and a predetermined distance transversely thereof in spaced alignment with said first and second recording styluses upon each chart engaging actuation, and means operating on said mounting means to move the third stylus said predetermined distance upon each actuation, said operating means being connected with and responsive to operation of the brake of the vehicle.

8. In a device for testing the operation of a motor vehicle, the combination comprising a casing with a face opening, means within said casing constructed and arranged to support and feed a strip record chart at uniform speed across the face opening, a pair of spaced parallel tracks secured within said casing in a position to extend in spaced parallel relation transversely of the portion of the strip record chart being fed across the face opening, first and second recording styluses within the casing mounted for reciprocation on the respective tracks, an operating member adapted to respond to variations in the engine speed of the vehicle extending into the casing and operatively connected with said first recording stylus, an operating member adapted to respond to the speed of the vehicle extending into the casing and operatively connected with said second stylus, said first and second recording styluses being arranged for continuous engagement with transversely spaced parts of the portion of the strip record chart being fed across the face opening, an intermittently operable third recording stylus normally disengaged from the strip record chart, means pivotally mounting said stylus within the casing for sequential movement into engagement with another part of the strip record chart being fed across the face opening and a predetermined distance transversely thereof in spaced alignment with said first and second recording styluses upon each chart engaging actuation, and electromagnetic responsive means operating on said mounting means for moving the third stylus said predetermined distance and releasing it for return to normally disengaged position, said electromagnetic means being connected with and responsive to operation of the brake of the vehicle, whereby each period of brake operation is represented on the strip record chart by a transverse line of predetermined length and a horizontal line corresponding to the duration of the period.

RALPH C. MOFFITT.
CLARENCE C. CHELF.

REFERENCES CITED

The following references are of record in the file of this patent:

UNITED STATES PATENTS

| Number | Name | Date |
|---|---|---|
| 1,404,770 | Hopkins | Jan. 31, 1922 |
| 1,725,204 | Moorhead | Aug. 20, 1929 |
| 1,886,844 | Spitzglass | Nov. 8, 1932 |
| 2,074,118 | Ross et al. | Mar. 16, 1937 |
| 2,291,475 | Kellogg et al. | July 28, 1942 |
| 2,361,990 | Brown | Nov. 7, 1944 |
| 2,414,976 | Redhed | July 28, 1947 |